United States Patent [19]

Martin et al.

[11] 4,095,043

[45] June 13, 1978

[54] ENCLOSURE WITH STRAIN RELIEF

[75] Inventors: Harold B. Martin, West Caldwell; Erwin O. Wagner, Kenilworth, both of N.J.

[73] Assignee: Graber-Rogg, Inc., Cranford, N.J.

[21] Appl. No.: 686,476

[22] Filed: May 14, 1976

[51] Int. Cl.² .............................................. H01R 13/58
[52] U.S. Cl. ................................... 174/65 R; 174/135; 339/105; 339/107
[58] Field of Search ...................... 174/65 R, 135, 155, 174/156, 157, 59, 92; 339/105, 107

[56] References Cited

U.S. PATENT DOCUMENTS

| 945,350 | 1/1910 | Tinsley | 174/157 |
|---|---|---|---|
| 1,240,844 | 9/1917 | Gregur | 174/155 |
| 2,707,623 | 5/1955 | Schwaneke | 174/135 UX |
| 2,709,246 | 5/1955 | Abbott | 339/107 X |
| 2,894,056 | 7/1959 | Bogese | 174/92 |
| 3,218,435 | 11/1965 | Mandziak | 174/135 X |
| 3,279,014 | 10/1966 | Fischer | 174/65 R X |
| 3,617,615 | 11/1971 | Balzer | 339/107 X |
| 3,624,270 | 11/1971 | Turner | 339/105 X |
| 3,826,935 | 7/1974 | Grierson et al. | 174/135 X |
| 3,858,160 | 12/1974 | Denton | 174/135 X |

FOREIGN PATENT DOCUMENTS

| 1,171,043 | 5/1964 | Germany | 174/135 |
|---|---|---|---|
| 1,938,927 | 2/1971 | Germany | 174/135 |
| 440,219 | 12/1935 | United Kingdom | 174/59 |
| 764,909 | 1/1957 | United Kingdom | 174/65 R |

*Primary Examiner*—Laramie E. Askin

[57] ABSTRACT

In an appliance having first and second surfaces which are joined to form an enclosure or housing therefor, a strain relief for a power cord is integrally formed therewith. The strain relief includes a pair of posts extending from the first surface for receiving the power cord thereon and a post extending from the second surface. When the surfaces are joined, the second surface post engages, deforms and holds the power cord in a path formed by the first and second surface posts.

2 Claims, 2 Drawing Figures

ENCLOSURE WITH STRAIN RELIEF

BACKGROUND OF THE INVENTION

It has been known that power cords extend from the interior of an electrical appliance housing through a strain relief located in an opening provided in said housing, the strain relief being either an individual component or an integrally connected element connected to the power cord, per se. Obviously, such prior art strain reliefs not only required special tooling and costs for the manufacture thereof but also required additional labor time in the assembly of the appliance. Further, additional handling and inventory space was required for such strain relief. Also, at times, the individual type strain reliefs were capable of being easily removed by non-qualified personnel thereby resulting in injury and electric shock to such personnel.

Accordingly, it is an object of this invention to eliminate such individual strain reliefs of the prior art and to obviate the difficulties associated therewith.

It is another object of this invention to provide a strain relief which is formed upon the connection of first and second surfaces employed in the assembly of an enclosure or housing for an electrical appliance.

Further, it is an object of this invention to provide a strain relief which is integrally formed upon the formation of an electrical appliance housing.

DRAWINGS

Other objects and a fuller understanding of the invention may be had by referring to the drawings wherein.

SUMMARY OF THE INVENTION

Figure 1:
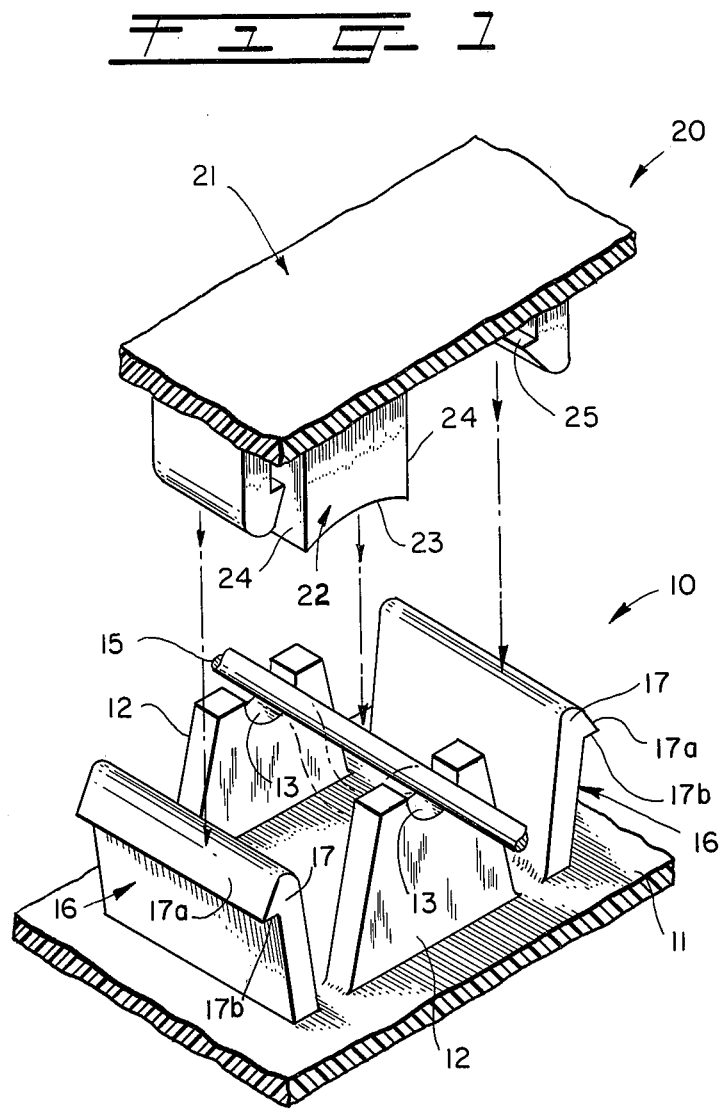
FIG. 1 is an exploded isometric view of one embodiment of the invention.

Broadly, the invention is concerned with a strain relief for a power cord in an appliance having a first surface which is capable of being connected to a second surface in the assembly of a housing for said appliance, the strain relief including means cooperatively associated with the first surface for receiving the power cord, and a post extending from the second surface for deforming the power cord and securely holding it in a path formed with the first surface receiving means.

More particularly, the strain relief includes a pair of posts extending from the first surface for receiving the power cord, each post having a latching member located on either side thereof. A post extends from the second surface for engaging, deforming and holding the power cord in a path formed by the first surface posts and second surface post when the first and second surfaces are joined. As the first and second surfaces are joined, the latching members temporarily deform and subsequently flex to their normal position as each engages respective latch receiving means to lock the first and second surfaces together.

DESCRIPTION OF THE PREFERRED EMBODIMENT

With reference to the drawing, there is depicted a lower member made of any suitable material, such as plastic, and generally referred to at 10, which preferably may be integrally connected to any first surface 11 of an appliance, such as a motor housing, lamp housing or any other similar housing or enclosure wherein conventional type strain reliefs are individually connected thereto for securely receiving an electrical power cord exiting from the interior of said housing or enclosure. In the preferred embodiment, lower member 10 includes a pair of posts 12—12 which project from the first surface 11 in parallel relationship, each post preferably having a recess 13 therein of a similar configuration to the cross-section of a power cord 15 exiting from the interior of the housing. Located adjacent to posts 12—12 are a plurality of latching elements, generally referred to at 16—16, which extend from surface 11. Each latching member is provided with a hook portion 17 having a tapered surface 17a and an abutting surface 17b whose function will become apparent, as later described. Each latching element 16—16 is located a predetermined distance from posts 12—12, and each is of a desired height to insure a sufficient temporary deforming thereof and locking with an upper member 20, now to be described.

Upper member 20 is located on a second surface 21 of the appliance, said second surface generally being a base, cover or other complementary component, which when attached to the first surface 11, completes the formation of the appliance housing. Upper member 20 preferably is made of a material similar to lower member 10, and includes a single post 22 extending fo second surface 21, post 22 being so located on the second surface that it is capable of being positioned between posts 12—12 of lower member 10 when the upper and lower members are joined together. Preferably, a recess 23 is formed between a pair of side walls 24—24 for facilitating the positioning and holding of the power cord 15. A pair of hook receiving members 25—25, such as ledges, recesses, slots or the like, are located on a portion of the second surface 21 and on either side of post 22.

In the assembly of the first housing surface 11 with the second housing surface 21 to complete the formation of the appliance housing and strain relief integral therewith, power cord 15 initially is positioned over post recesses 13—13 and upper member 20 is moved into engagement with lower members 10. In so doing, single post 22 engages, deforms and bends that portion of cord 15 positioned across posts 12—12 and, simultaneously, latching element tapered surfaces 17a—17a wipe against a portion of second surface 21 located in juxtaposition with the hook receiving members 25—25 causing the latching elements 16—16 to temporarily deform until they mesh or engage with their respective hook receiving members whereupon the latching elements flex and return to their normal at rest position. As a result, the hook portions 17—17 are snugly received within the hook receiving members and cannot be tampered with or removed therefrom, thereby discouraging one from disassembling the formed housing. Significantly, power cord 15 is securely held in a path formed between posts 12—12 and post 22 with little, if any, free area remaining in said path.

Figure 2:
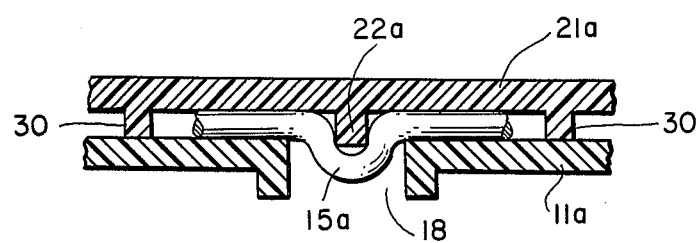
FIG. 2 is a schematic illustration in cross section of another embodiment of the invention.

In a second embodiment of the invention, as seen in FIG. 2, there is illustrated a schematic illustration of the inventive formed strain relief in its simplest form. A first surface 11a of a housing to be formed is provided with an opening 18 therein, upon which a lower cord 15a is located. A second surface, 21a, for completing the housing, is provided with a post 22a having a free end surface area relatively smaller than opening 18. Accordingly, when the second surface is brought into complementary engagement with the first surface to form the housing, post 22a exerts a force on cord 15a such that the cord is deformed and moved into opening 18. As a result, post 22a securely wedges and holds cord 15a within the path formed by said post and opening 18. Elements 30—30 extending from second surface 21a engage first surface 11a and are connected thereto by any conventional bonding means, such as an adhesive, solvent, sonic welding or the like. Obviously, if desired, a latching means similar to that described in the first embodiment may be utilized in lieu of the aforesaid bonding means.

We claim:

1. In an enclosure wherein a first surface is capable of being connected independently to a second surface to form the assembled enclosure, a strain relief formed by the connection of said surfaces for holding a power cord when extending from the interior of said enclosure which comprises:

a pair of spaced posts each extending from the first surface and each terminating in a free end, each post of said pair of spaced posts having within its free end a recess for receiving and captivating a power cord therein, a post extending from said second surface and terminating in a free end, said second surface post being of a length sufficient to enter into the space between said pair of spaced posts when the first and second surfaces are joined, all of said posts cooperating to engage, deform and hold a power cord in a path defined by their free ends when the first and second surfaces are joined and the second surface post is located in the space between the first surface posts, and means integrally associated with said first and second surfaces for securely holding the first and second surfaces together simultaneously to form the enclosure, said means including a latching member located on either side of the first surface posts and extending perpendicularly thereto, each latching member having a hook thereon for engagement with latch receiving means on the second surface.

2. In an enclosure, according to claim 1, wherein the latch receiving means includes a hook receiving portion thereon, and wherein each latching member is temporarily deformed as the first surface is joined to the second surface, each latching member flexing to its normal position as its hook is located in its respective hook receiving portion to provide a tamper-proof strain relief.

* * * * *